United States Patent [19]

Gardlund

[11] 4,402,585

[45] Sep. 6, 1983

[54] ENVELOPE FOR TRANSPARENCIES FOR OVERHEAD PROJECTORS AND LIKE PROJECTING APPARATUSES

[75] Inventor: Göran W. Gardlund, Lidingö, Sweden

[73] Assignee: Minnesota Mining & Manufacturing Company, St. Paul, Minn.

[21] Appl. No.: 252,121

[22] PCT Filed: Feb. 25, 1981

[86] PCT No.: PCT/US81/00251

§ 371 Date: Feb. 25, 1981

§ 102(e) Date: Feb. 25, 1981

[87] PCT Pub. No.: WO81/02639

PCT Pub. Date: Sep. 17, 1981

[30] Foreign Application Priority Data

Mar. 13, 1980 [SE] Sweden .................. 8001995

[51] Int. Cl.³ .................. G03B 21/11; F03B 23/00
[52] U.S. Cl. .................. 353/120; 353/DIG. 5
[58] Field of Search .................. 353/120, DIG. 5; 40/158 R, 158 B, 159, 152

[56] References Cited

U.S. PATENT DOCUMENTS

| 781,222 | 1/1905 | Morse . | |
|---|---|---|---|
| 868,758 | 10/1907 | Bexell . | |
| 1,174,914 | 3/1916 | Vetter . | |
| 1,250,074 | 12/1917 | Apfelbaum . | |
| 2,296,272 | 9/1942 | Sherbinin . | |
| 2,461,536 | 2/1949 | Farkas . | |
| 2,538,894 | 1/1951 | Bender . | |
| 2,741,572 | 4/1956 | Lennartz . | |
| 3,253,358 | 5/1966 | Wright | 353/120 X |
| 3,264,936 | 8/1966 | Schultz et al. | 353/120 X |
| 3,438,702 | 4/1969 | Milhaupt et al. | 353/120 X |
| 3,438,703 | 4/1969 | Winnemann | 353/120 |
| 3,524,703 | 8/1970 | Wright | 353/120 X |
| 3,531,193 | 9/1970 | Diehl | 353/120 X |
| 3,536,393 | 10/1970 | Kitch | 353/120 |
| 3,537,792 | 11/1970 | Furniss et al. | 353/120 X |
| 3,544,211 | 12/1970 | Acbee | 353/120 |
| 3,600,079 | 8/1971 | Smith | 353/120 |
| 3,649,100 | 3/1972 | Kirot . | |
| 3,709,590 | 1/1973 | Bisberg | 353/120 |
| 3,857,192 | 12/1974 | Mascolo . | |
| 3,869,201 | 3/1975 | Lysle | 353/120 |
| 3,875,693 | 4/1975 | Pelkey . | |
| 3,913,740 | 10/1975 | Bisberg | 353/120 X |
| 3,980,401 | 9/1976 | Holliday | 353/120 x |
| 4,140,565 | 2/1979 | Parker . | |

FOREIGN PATENT DOCUMENTS 382266 2/1927 Sweden .
346166 4/1972 Sweden .

Primary Examiner—Harry N. Haroian
Attorney, Agent, or Firm—Cruzan Alexander; Donald M. Sell; John C. Barnes

[57] ABSTRACT

An envelope for transparencies for overhead projectors comprises a substantially rectangular pocket of transparent plastic sheet material. The pocket is open along at least one side edge for insertion of the transparency to be presented therebetween. At least one opaque flap is attached in a foldable manner along one of the longitudinal side edges of the pocket, said flap being attached to and spaced a distance from the longitudinal edge such that holes may be punched in the sheet material along said side edge between the flap and said edge and that in the unfolded position the flap covers the longitudinal side edge and in the folded position it exposes said longitudinal side edge and any holes to permit storage in a binder, file or the like.

9 Claims, 8 Drawing Figures

ND LIKE
ENVELOPE FOR TRANSPARENCIES FOR OVERHEAD PROJECTORS AND LIKE PROJECTING APPARATUSES

DESCRIPTION

1. Technical Field

This invention relates to an envelope for transparencies for overhead projectors and like projecting apparatuses, said envelope comprising a substantially rectangular pocket of transparent plastic sheet material which is open at least along one side edge for insertion of the transparency to be presented therebetween.

2. Background Art

It is previously known, particularly in giving lectures and in teaching, to make use of transparencies which are presented to the viewers on a screen by means of an overhead projector. To realize a professional presentation of these transparencies there have been developed various types of envelopes for storage and presentation of the transparencies. In one type of envelope, see for example U.S. Pat. No. 3,875,693, the transparency is framed in a frame of carton, paperboard or like material. The frame is meant to mask the illumination gaps formed about the periphery of the transparency proper. The frame can also be used for making the notes and other memoranda needed by the lecturer. The disadvantage of these framed transparencies is that they will be bulky and therefore difficult to store and transport since they do not fit standard binders or files and shelves, respectively. Moreover it is troublesome to attach the transparencies to the frames. In another type of envelope, cf. for example Swedish printed patent application No. 382,266, the envelope is a plastic sheet pocket with punched holes along one side, said plastic pocket being open at the top for insertion of the transparency to be presented. These envelopes are simple to handle, store and transport as the outer dimensions of the plastic sheet pocket are conformed to those of standard binders or files. Moreover, the transparency is protected by the envelope, and at the presentation written notes can be made on the envelope, and after the lecture the envelope can be replaced by another one. However this envelope is disadvantageous in that peripheral illumination is not masked and that the lecturer can not make written notes on the envelope without these notes being also shown on the screen. Further, the contours of the punched holes are also shown on the screen. This envelope therefore yields a total picture on the screen, which in no way satisfies the requirements placed on a professional presentation of transparencies of overhead projectors.

Further examples of covers or envelopes for storage of transparencies for overhead projectors are disclosed by U.S. Pat. Nos. 3,253,358; 3,264,936; 3,438,702; 3,438,703; 3,524,703; 3,536,393; 3,537,792; 3,544,211 and 3,600,079 and Swedish printed patent application No. 346,166. It is easily realized that the covers and envelopes according to these publications are complicated to handle and display many of the drawbacks mentioned above when prior art envelopes were described. Besides, most of those patents presuppose that the transparencies shall be presented in a definite sequence and the covers of most transparencies are difficult to exchange.

The object of the present invention is to provide an envelope of the type mentioned in the introduction, said envelope eliminating the disadvantages of the prior art envelopes and being simple to handle, store and transport and also of reliable design and function.

This object is realized by the present invention in that at least one opaque flap is attached in a foldable manner along one of the longitudinal side edges of the pocket, said flap being attached to and spaced a distance from the longitudinal edge such that holes may be punched in the sheet material along said side edge between the flap and said edge and such that in the unfolded position the flap covers the longitudinal side edge and in the folded position it exposes said longitudinal side edge and any holes to permit storage in a binder, file or the like.

Preferred embodiments of the invention have been given the characteristic features appearing from the subclaims.

The advantages gained by the envelope according to the invention are numerous. In the inwardly folded position of the flaps the envelope fits all standard file systems, ensuring simple storage and transport; it is easily and efficiently handled at the presentation as the flaps are preferably formed from firm plastic or paperboard; the insertion of the transparency is facilitated in that the envelope is preferably open along two sides, one of said sides being the longitudinal side having the punched holes therein. This will give a better retention of the transparency in the envelope, when stored in a file or binder. Moreover, the lecturer had the possibility of making notes and other important memoranda on the outwardly foldable flaps which besides permit a professional presentation in that when outwardly folded they mask the peripheral illumination which would otherwise arise around the transparency at the presentation on a screen. By being enclosed in a pocket envelope the transparency is protected form dirt and dust, and during the lecture the lecturer can make notes on the envelope which can then be exchanged for another one before the next presentation. Further, the envelope according to the invention is usable in many countries since the holes punched in the envelope may be of international standard or the holes may be punched separately for each user. Being antistatic and antiadhesion treated, it does not attract dust, does not adhere to other envelopes and does not pick up text from the transparency.

Besides the envelope according to the invention is inexpensive to manufacture as use can be made of prior art techniques for continuous manufacture of the envelope.

DISCLOSURE OF INVENTION

The envelope for transparencies of the present invention comprises a rectangular pocket formed of transparent sheet material defining opposed rectangular faces which are separable at least along one side edge for insertion of the transparency therebetween. At least one opaque flap is attached in a foldable manner along one of the longitudinal side edges of the pocket. The flap is attached to and spaced a distance from the longitudinal edge such that in the unfolded position the flap extends beyond the side edge and the flap covers the longitudinal edge. In the folded position the flap exposes the longitudinal side edge. Holes may be punched along the side edge of the sheet material to permit storage of the envelope, in a binder, file or the like. The flaps are preferably formed of a plastic material which accepts written text by conventional writing appliances.

BRIEF DESCRIPTION OF DRAWINGS

The invention will be described in greater detail below, reference being had to the accompanying drawings which illustrate preferred embodiments. In the drawings.

BEST MODE FOR CARRYING OUT THE INVENTION

Figure 1:
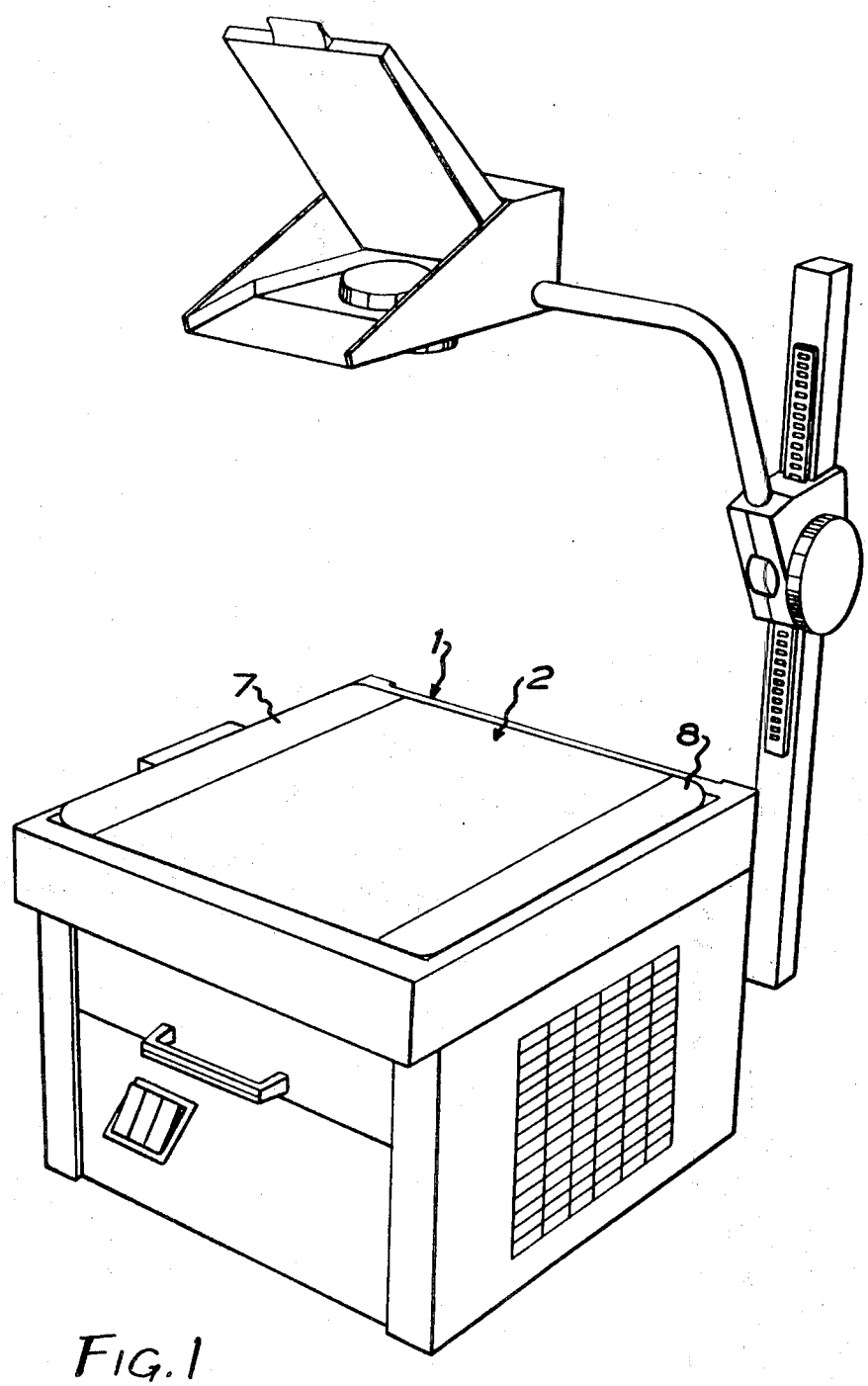
FIG. 1 is a perspective view of an overhead projector on the stage of which there is placed an envelope according to the invention in unfolded position.
Figure 2:
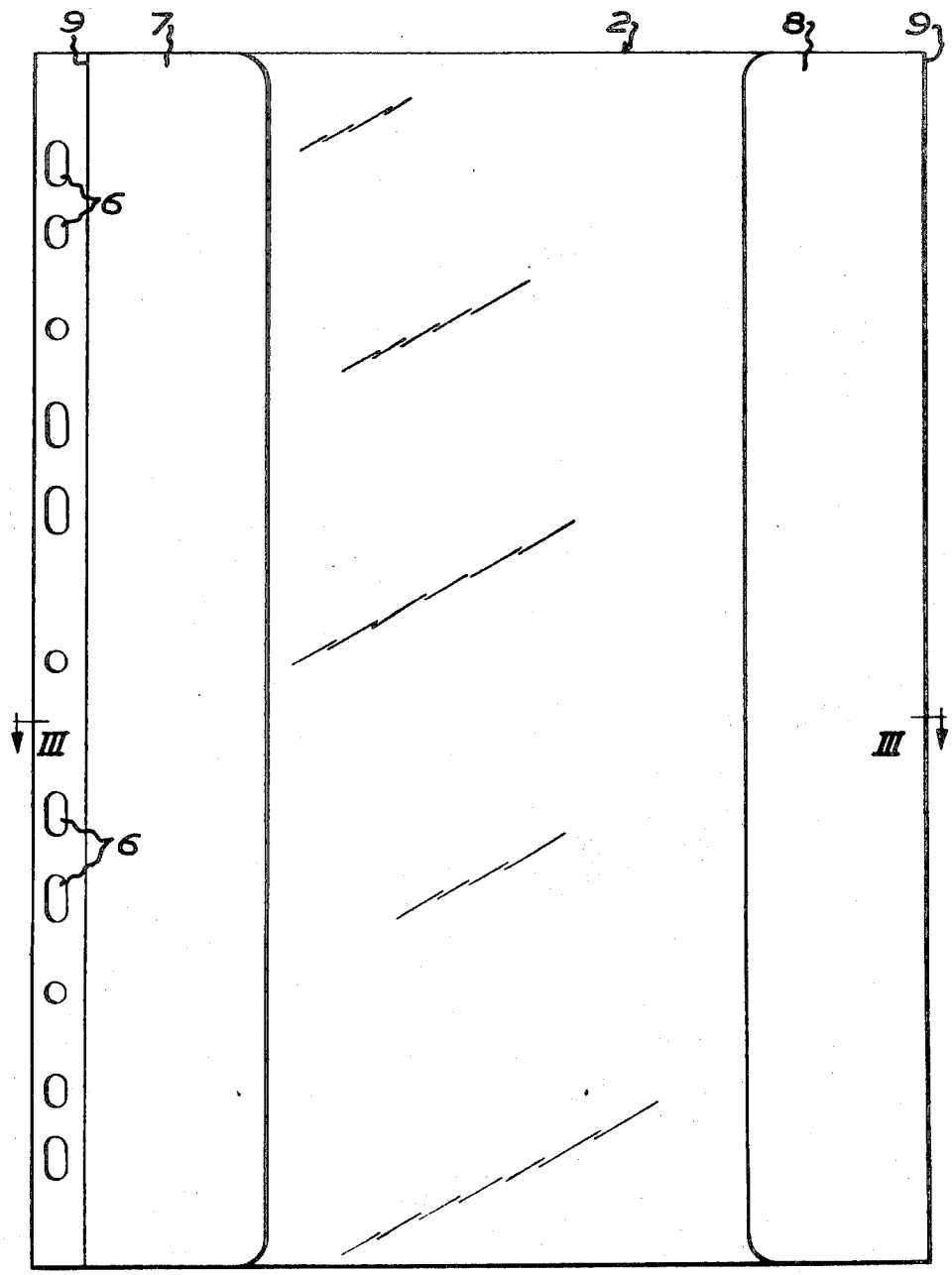
FIG. 2 is a plan view of the envelope in folded position.
Figure 3:
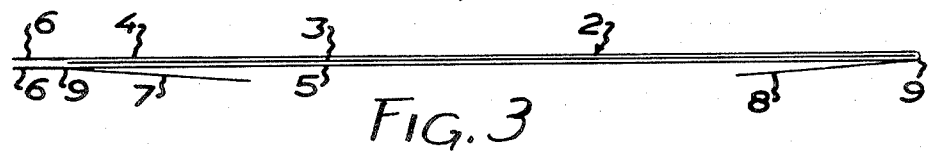
FIG. 3 is a section on line III—III in FIG. 2.

FIG. 1 shows an overhead projector 1 of the kind used for educational and lecturing purposes for the projection of images on a screen. An envelope 2 according to the invention is placed on the horizontal stage of the overhead projector and said envelope encloses a transparency 3 to be presented. The position of the transparency 3 in said envelope is shown in FIG. 3. The envelope 1 and the transparency 3 are substantially rectangular and the envelope is slightly larger than the transparency both in width and preferably also in length. In the embodiment shown in FIGS. 1, 2 and 3 the envelope 1 comprises a pocket which consists of two sheets 4, 5 of transparent plastic material, preferably 60 mm polypropylene, said sheets being joined together at least along one side or formed by folding a large sheet to form the faces of the envelope. Preferably, the plastic material is antistatic and antiadhesion treated in order not to attract dust and in order that text on the transparency 3 should not be picked up by the sheets 4, 5 of the pocket. Along one longitudinal side, preferably the longitudinal side not joined together, the envelope may be provided with punched holes 6 to permit storage in a binder, file or the like.

Two opaque, substantially rectangular elongated flaps 7, 8 are attached in a foldable manner to the outer side of one sheet 5 of the pocket or envelope. The flaps are made from a material which accepts text written by conventional writing instruments. Further, the flaps are connected to the sheet 5 of the envelope such that they are readily folded from the unfolded position shown in FIG. 1 to the folded position shown in FIGS. 2 and 3, and vice versa. The flaps 7, 8 are attached to the sheet 5 by flexible adhesive tapes or by a foldable weld or flute 9. Naturally, the flaps can be connected to the sheet 5 in some other manner, provided that it produces a so-called hinge effect. As will appear from FIG. 2 the flap 7 at that longitudinal side edge which may be provided with punched holes 6, is connected to the sheet 5 spaced from said longitudinal side edge so that said punched holes are exposed in the folded-together state of the flaps to permit storage of the envelope in a binder, file or the like. In the unfolded state the flap 7 covers these punched holes so that they are not projected onto the screen on presentation.

In the unfolded state the envelope has a surface greater than the stage of the overhead projector so that said stage is entirely covered by the expanded envelope. Further, in the unfolded state the exposed surface portion of the envelope is smaller, at least in width, than the transparency 3 to be inserted therein. This will prevent illumination gaps from arising on one or both sides of the transparency when it is projected onto the screen.

Figure 4:
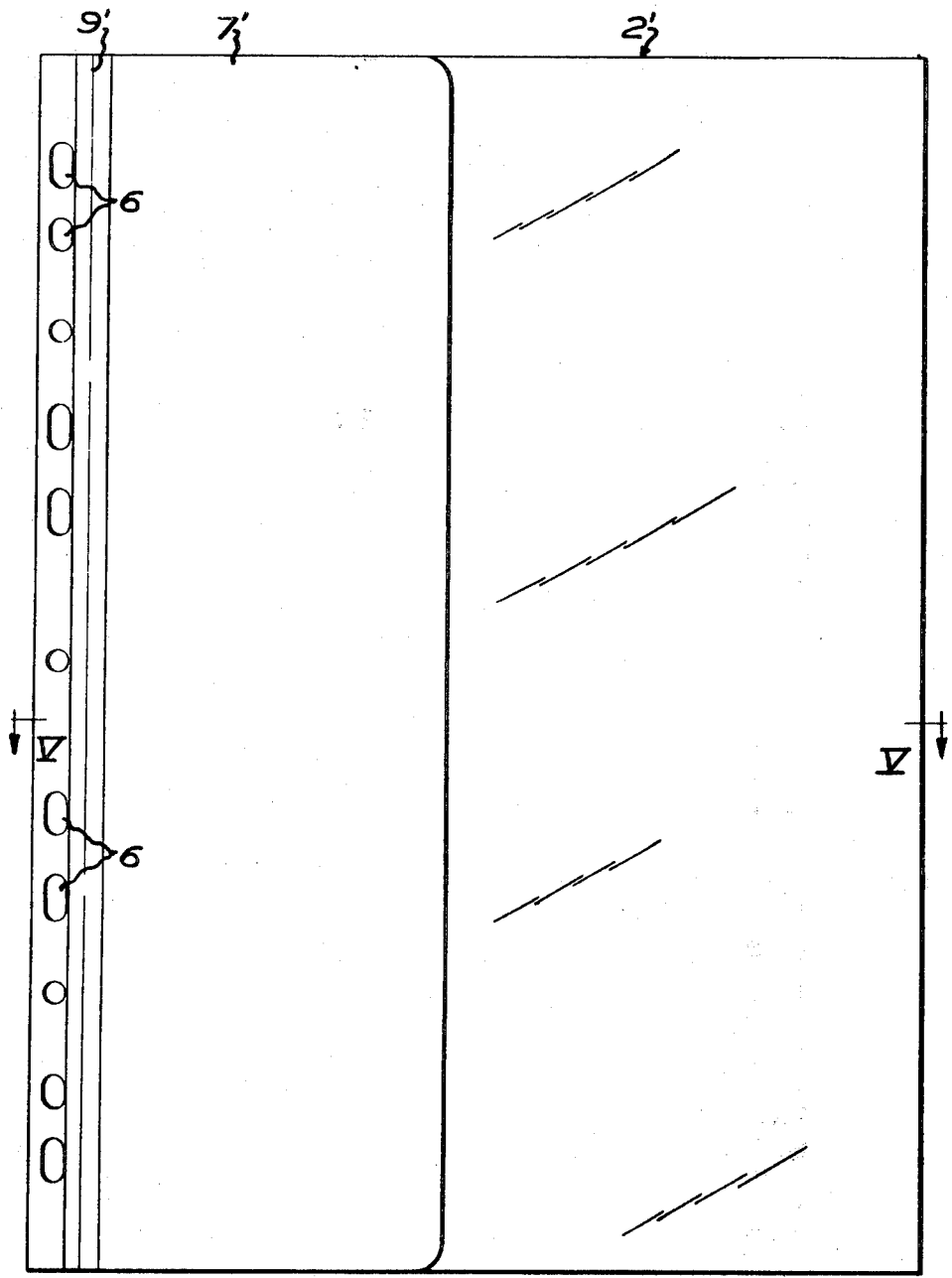
FIG. 4 is a plan view of another embodiment of the invention.
Figure 5:
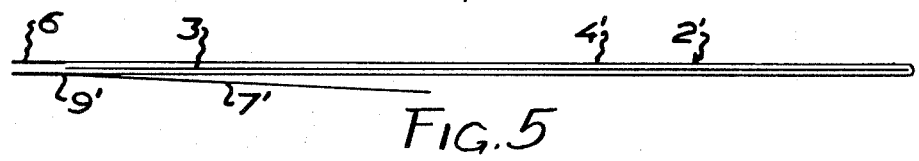
FIG. 5 is a section on line V—V in FIG. 4.

The embodiment described above relates to an envelope which has two flaps each of which is attached to one longitudinal side of the envelope. In another preferred embodiment the envelope has but one flap which is attached to that longitudinal side edge which may be provided with punched holes and which is so large that in the unfolded state the envelope covers the stage of the overhead projector. For presentation, an envelope of this embodiment is placed in such a manner on the stage of the overhead projector that the longitudinal side edge of the envelope which is devoid of a flap is aligned with or protrudes outside the adjoining boundary edge of the stage. With the envelope placed in this manner on the stage, the larger flap also makes the illumination gap at the longitudinal side edge having said punched holes therein. This will result in a professional presentation of the transparency, the projected image being slightly laterally offset to the image obtained by means of the first described embodiment having two flaps. This lateral offset of the image however results in an equally good presentation of the transparency, seen from the viewer. An embodiment of an envelope having but one flap is shown in FIGS. 4 and 5. This envelope 2', in which a transparency 3 is inserted, consists of a double-folded transparent plastic sheet 4', the superposed longitudinal side edge portions of which may be provided with punched holes 6. On one side of the envelope there is attached an opaque, substantially rectangular flap 7' by means of an adhesive tape 9' so that said flap can be laterally unfolded.

Figure 6:
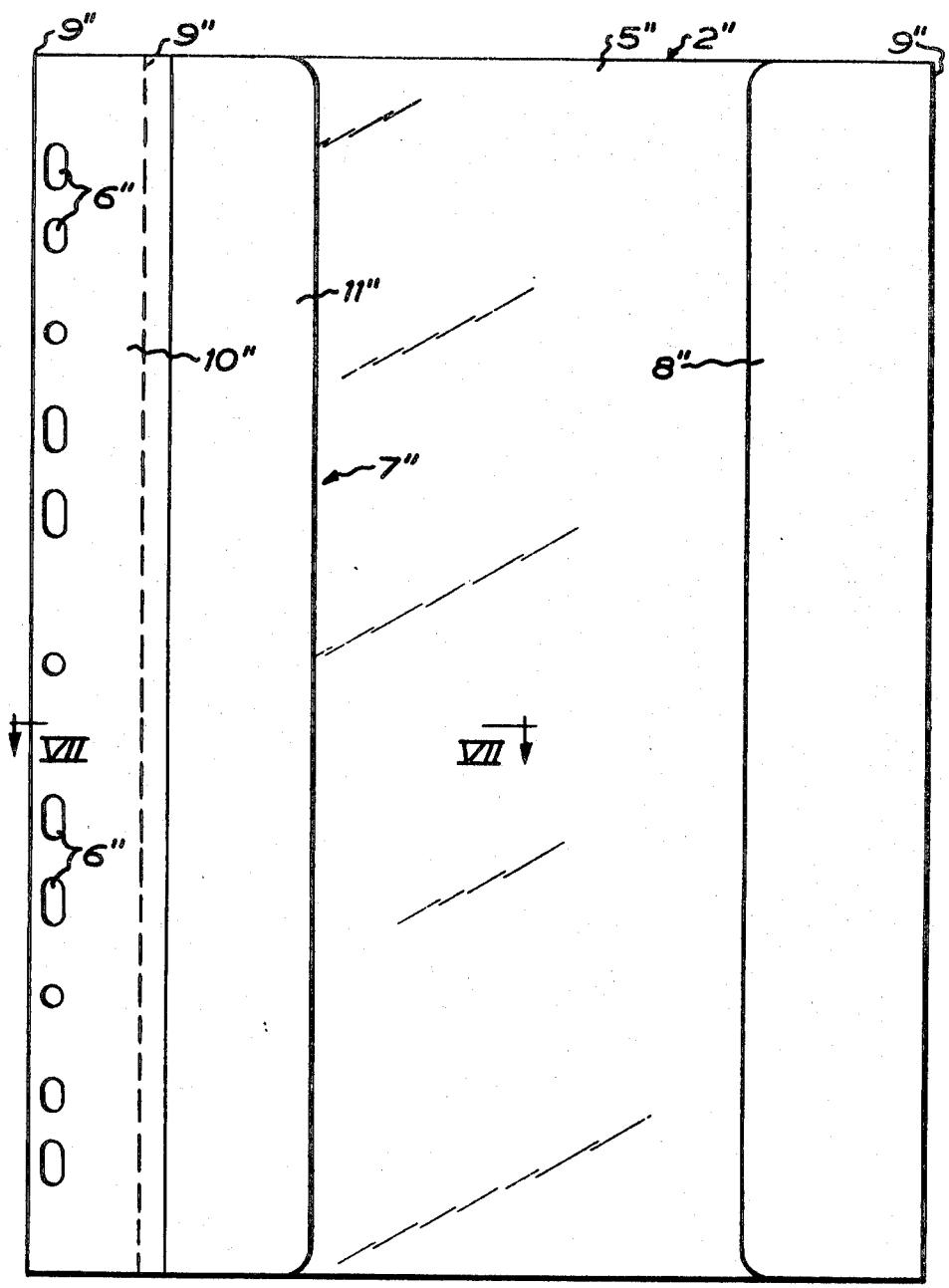
FIG. 6 is a plan view of a further embodiment of the invention.
Figure 7:
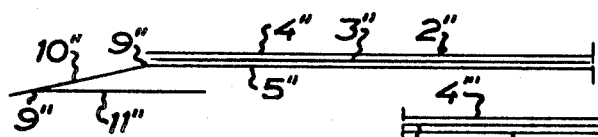
FIG. 7 is a partial section of line VII—VII in FIG 6.

FIGS. 6 and 7 illustrate a further embodiment of the envelope of the invention. The envelope 2" shown in FIGS. 6 and 7 comprise two plastic sheets 4", 5" between which a transparency 3" can be inserted. Provided along one of the longitudinal side edges is a flap 8". On the other longitudinal side edge, in which punched holes 6" may be provided, there is arranged a flap means 7" consisting of two flaps 10", 11". The flaps 8", 10", and 11" on the two longitudinal side edges of the envelope are connected at 9" respectively to the envelope and each other in the manner described above. The flap 10", which is one of the two flaps constituting the flap means 7" and which is attached to the envelope, may be provided with punched holes 6" which correspond to the holes 6 punched in the envelope and which will be placed straight opposite the holes in the envelope when the two flaps 10" and 11" are folded in as shown in FIG. 6. When the flap means 7" is moved to the unfolded position used for projection the flap 10" is folded out so that, when used, the flap will cover that portion of the stage which is outside the envelope. The flap 11" will be folded in towards the envelope and in the unfolded position of the flap means 7" the flap 11" will cover the longitudinal side edge provided with the punched holes 6". An essential advantage of this embodiment is that notes made on the flap 11" can be read by the lecturer in the unfolded and folded positions of the flap means 7" without making it necessary for the lecturer to fold the flap means.

In a further development of the invention the longitudinal side edge of the pocket of the envelope along which the punched holes 6 may be provided is of a slightly larger thickness than the measuring pocket. This will appear from FIG. 5. The result is a more stable envelope. To obtain still higher stability of the envelope and to better retain the transparency inserted therein it is also possible to allow part of the longitudinal side edges of the pocket, which may be provided with punched holes, to remain joined together. To satisfy the contemplated objects of the invention at least one side edge must be joined together. If one chooses to allow but one side edge to be joined together, which may bring advantages for reasons of cost and production, said side edge should be that longitudinal side edge which is not to be provided with punched holes.

Figure 8:
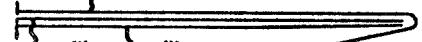
FIG. 8 is a partial section of still another embodiment of the invention.

However, in still another embodiment of the present invention, which is shown in FIG. 8, that longitudinal side edge which is not to be provided with holes, is open. In this case the opaque flap 8''' is attached to one sheet 4''' of the envelope whereby the flap 8''', when the envelope is to be stored in a binder, file or the like, is foldable over the opening between the two sheets towards the front side of the other sheet 5'''; and will thus provide a satisfactory locking-up of the transparency 3''' inserted in the envelope during said storage.

The flaps according to the proposed embodiments of the invention may of course be arranged either on the front side of the envelope, as shown in the drawings, or else the flaps may be arranged on the back side of the envelope. If the flaps are positioned on the back side or bottom side of the envelope when on the projector it is possible that the flaps of an envelope according to the first embodiment will unfold themselves to their developed position by dropping the envelope at some distance from the stage whereby the air resistance will cause the flaps on either side of the envelope to unfold automatically and expose the transparency inserted between the sheets 4, 5.

The punched holes 6 should be of the international type to fit most of the conventional file systems. They may of course also be adapted to a certain file system, without departing from the scope of the present invention.

Moreover, the shape of the flaps can be modified within the scope of the invention. It is essential that they mask the illumination gaps which would otherwise occur on one or both sides of the pocket.

The invention can of course be subject to further modifications within the scope of the appended claims.

I claim:

1. Envelope for transparencies for overhead projectors, said envelope comprising a substantially rectangular pocket, of transparent plastic sheet material having two longitudinal side edges connected by shorter side edges, which is open at least along one side edge for insertion of the transparency to be presented therebetween, at least one opaque flap attached in a foldable manner along one of the longitudinal side edges of the pocket, said flap being attached to and spaced a distance from the longitudinal edge such that in the unfolded position the flap covers the longitudinal side edge and in the folded position it exposes said longitudinal side edge.

2. An envelope as claimed in claim 1, wherein the envelope has two flaps each of which is provided along one longitudinal side edge of the pocket.

3. An envelope as claimed in claim 1 or 2, wherein the pocket is open along two adjoining side edges, one of which is a longitudinal side edge provided with punched holes.

4. An envelope as claimed in claim 1 or 2, wherein each flap is made from a material that accepts text written thereonto.

5. An envelope as claimed in claim 1 or 2, wherein each flap is attached to the pocket by a length of adhesive tape.

6. An envelope as claimed in claim 1 or 2, wherein each flap is connected to the pocket by a foldable weld.

7. An envelope as claimed in claim 1 or 2, wherein each flap consists of two flap members of which a first flap member is attached to the pocket and another flap member is attached to the first flap member, said first flap member having punched holes along one edge and said other flap member is adapted, in unfolded state to cover said punched holes in the first flap member.

8. An envelope as claimed in claim 1 wherein the pocket is open along at least that longitudinal side edge opposite the opaque flap and that a flap is arranged along said opposite longitudinal side edge and is attached in a foldable manner to one side of said pocket, said flap being adapted in resting position to be folded over said opening towards the other side of said pocket.

9. An envelope as claimed in claim 1 or 8 wherein said longitudinal side edge of said pocket adjacent said opaque flap is provided with punched holes for storage in a binder.

* * * * *

UNITED STATES PATENT AND TRADEMARK OFFICE
CERTIFICATE OF CORRECTION

PATENT NO. : 4,402,585

DATED : September 6, 1983

INVENTOR(S) : Göran W. Gardlund

It is certified that error appears in the above-identified patent and that said Letters Patent is hereby corrected as shown below:

Col. 3, line 38, "mm" should be -- μm --.

Col. 4, line 22, "makes" should be -- masks --.

Signed and Sealed this

Twenty-fourth Day of January 1984

[SEAL]

Attest:

GERALD J. MOSSINGHOFF

Attesting Officer

Commissioner of Patents and Trademarks